Sept. 12, 1950        I. I. MERKUR        2,522,187
FILM MARKER
Filed Oct. 3, 1947        3 Sheets-Sheet 1
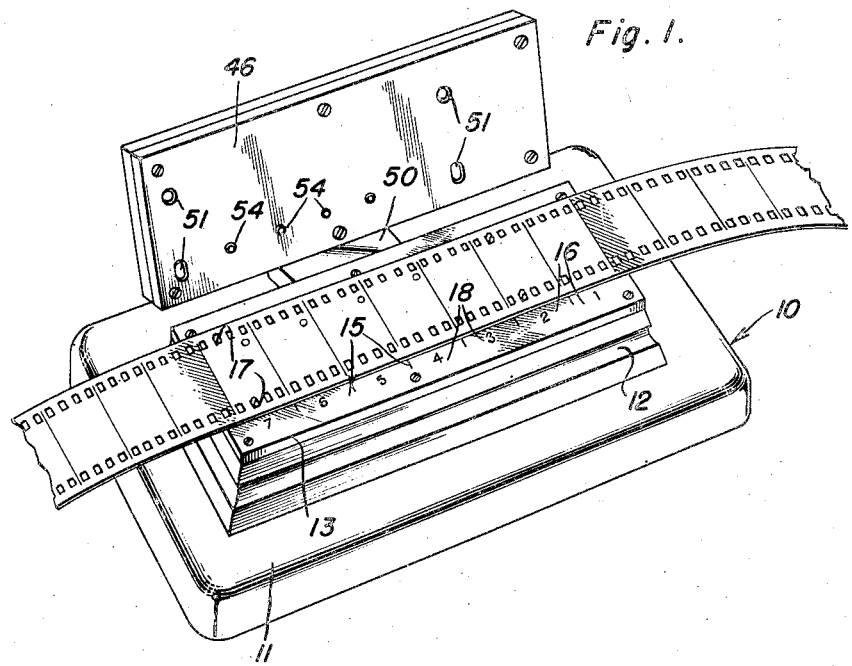
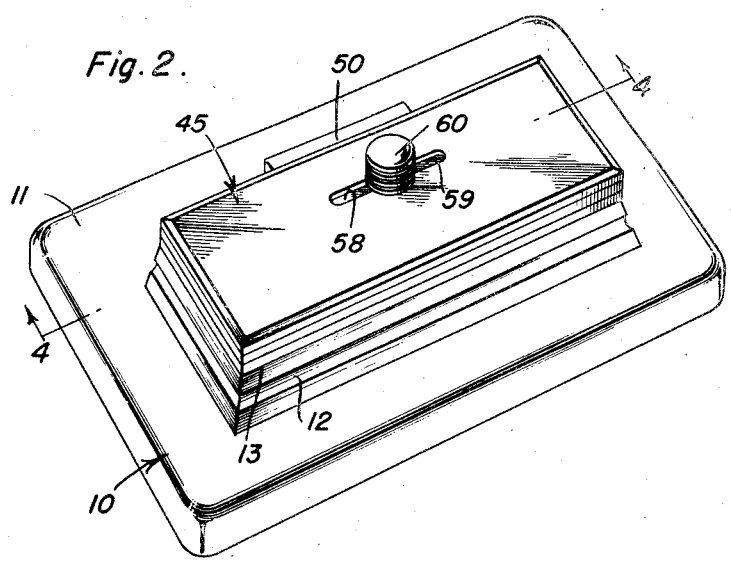
Inventor
Irving I. Merkur
By *Clarence A. O'Brien and Harvey B. Jacobson*
Attorneys Sept. 12, 1950   I. I. MERKUR   2,522,187
FILM MARKER
Filed Oct. 3, 1947   3 Sheets-Sheet 2

Inventor
Irving I. Merkur

By Clarence A. O'Brien
and Harvey B. Jacobson
Attorneys

Sept. 12, 1950          I. I. MERKUR          2,522,187

FILM MARKER

Filed Oct. 3, 1947          3 Sheets-Sheet 3

Inventor

Irving I. Merkur

By Clarence A. O'Brien
and Harvey B. Jacobson
Attorneys

Patented Sept. 12, 1950

2,522,187

UNITED STATES PATENT OFFICE 2,522,187

FILM MARKER

Irving I. Merkur, New York, N. Y.

Application October 3, 1947, Serial No. 777,618

10 Claims. (Cl. 33—189)

1

This invention relates to a film marker and more particularly to a device for applying cue marks to motion picture film.

In the projection of motion pictures it is important to give the operator of the projection machine a signal which will indicate the approach of the end of a reel of film. Hence it is customary to remove a portion of the emulsion from the surface of the film at a distance of about nine feet from the end of the reel, and also to remove a portion of the emulsion from the film at a distance of about six inches from the end of the reel of film. Such removal of the emulsion produces transparent windows in the film through which the light from the projector lamp is visible and when the operator sees the nine foot marks it is his cue to start the motor of a second projector. When the signal is given for the six inch group of marks he closes the shutter of the first projection machine and opens the shutter of a second machine so that there is no break in the projection of a picture involving a number of reels of film.

The primary object of this invention is to facilitate the removal of the emulsion from a film so that the signals above described will appear on the projection screen as the end of a reel of film is approached.

Another object is to produce in a strip or reel of film a group of cue marks with a single operation of the film marking equipment.

A still further object is to insure the accuracy of the marking of the film and thereby to produce on the projection screen the necessary signals to the projection operator in proper timed relation with the approach of the end of a reel of film.

The above and other objects may be attained by employing this invention which embodies among its features a base, guide pins projecting upwardly from the base and adapted to cooperate with the perforations along the marginal edges of the strip of motion picture film in locating the film on the base, a cover hinged to the base and adapted to cooperate therewith in holding the strip of film against movement relative to the base and a scraper carried by the cover for engagement with the emulsion coated side of the film to remove the emulsion from a restricted area of the film.

Other features include means yieldingly to hold the scraper against the film, a plurality of scrapers arranged to remove a portion of the emulsion in each picture of a group of pictures on the film and means to actuate said scrapers in unison.

Still other features include a base of light transmitting material upon which a portion of the film to be marked is adapted to be supported with its emulsion coated surface disposed upwardly, guide marks carried by the base and defining thereon a group of areas each conforming in size and shape to a picture on the film, means beneath the base to illuminate the film, a cover adapted to be seated on the base to clamp the film thereon and a scraper carried by the cover for engagement with the film for removing a limited area of the emulsion from a picture on the film.

In the drawings:

Figure 1 is a perspective view of a film marker embodying the features of this invention and illustrating the cover in raised position with a film placed on the base ready for marking;

Figure 2 is a view similar to Figure 1 illustrating the cover closed and no film in the marker;

Figure 3:
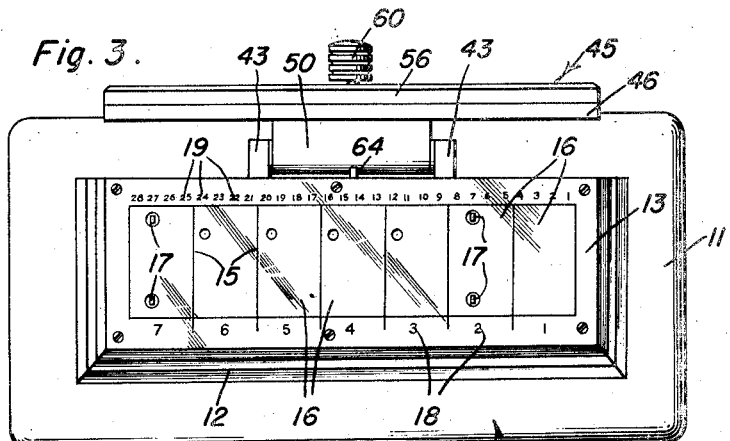
Figure 3 is a top plan view of the marker in open position with the film removed therefrom.
Figure 4:
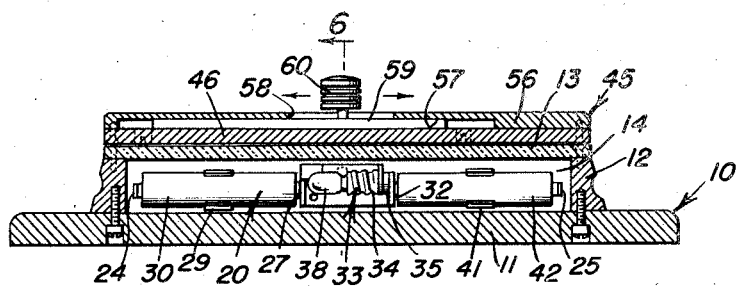
Figure 4 is a longitudinal sectional view taken substantially along the line 4—4 of Figure 2.
Figure 5:
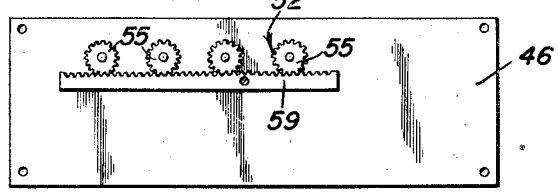
Figure 5 is a plan view of the cover showing the top plate thereof removed.
Figure 9:
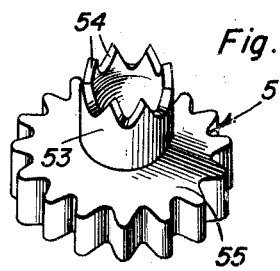
Figure 9 is a perspective view of one of the rotary scrapers.
Figure 6:
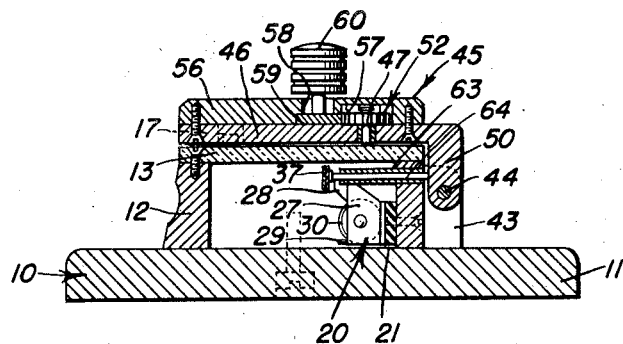
Figure 6 is a transverse sectional view taken substantially along the line 6—6 of Figure 4.

Referring to the drawings in detail a base designated generally 10 comprises a bed plate 11 supporting on its upper surface an elongated rectangular frame 12. Screwed or otherwise fastened to the top edge of the frame 12 is a plate 13 formed of a transparent or translucent material. This plate forms the top closure for a chamber 14 in which the illuminating unit is housed and formed at spaced intervals on the plate 13 are index marks 15 forming contiguous areas 16 which are of a size conforming to the size of pictures produced on a conventional motion picture film. Projecting upwardly from the plate 13 in proper spaced relation to penetrate the sprocket openings of a conventional motion picture film are gauge or guide pins 17 which serve to hold the film against longitudinal or transverse movement with relation to the plate 13. Formed along one edge of the plate 13 which projects beyond the edge of a film placed thereon are index marks 18 which serve to number the panels 16 defined by the lines 15. Formed along the opposite edge of the plate 13 are index marks 19 which correspond to the sprocket openings in the film when the latter is placed on the base with the pins 17 projecting therethrough.

Contained within the chamber 14 is an illuminating unit designated generally 20 which comprises a strip 21 of non-conducing material provided adjacent opposite ends with contact plates 22 and 23 having outwardly extending contact tongues 24 and 25. Fixed to the plate or non-conducting strip 21 intermediate its ends is a contact plate 26 having an outstanding arm 27 which lies parallel with and extends in the direction of the tongue 24. This contact tongue 27 terminates in a contact arm 28, and carried by the non-conducting strip 21 intermediate the contact tongues 24 and 27 is a clip 29 into the open end of which a conventional dry cell 30 is introduced so that one terminal thereof engages the contact tongue 24, while the opposite terminal engages the contact tongue 27. Attached to the non-conducting strip 21 in spaced relation to the plate 26 is a plate 31 of conducting material carrying an outwardly and upwardly extending arm 32 to the outer end of which is fixed the central contact of a conventional miniature lamp socket designated generally 33. The shell 34 of the miniature lamp socket 33 is electrically isolated from the arm 32 by means of a suitable bushing 35 of non-conducting material and fixed to the base of the shell is an arm 36 carrying a spring contact finger 37. The arm 32 and the arm 36 extend parallel to the contact arm 27 while the spring contact finger 37 lies perpendicular thereto and is adapted normally yieldingly to engage the contact member 28 in order to establish a closed circuit through a conventional miniature lamp bulb 38. Fixed intermediate the ends of the spring finger 37 is a pad 40 of non-conducting material the purpose of which will more fully hereinafter appear. Carried by the non-conducting strip 21 intermediate the arm 32 and the spring tongue 25 is a clip 41 similar to that previously described and into the open end of which is introduced a dry cell 42 of conventional form, one contact of which bears against the contact finger 25 while the opposite terminal engages the arm 32. The illuminating unit 20 is mounted in the chamber 14 in such a manner that the contact plates 22 and 23 are grounded, and the dry cells 30 and 42 are preferably arranged so that when the spring finger 37 engages the contact point 28 the dry cells 30 and 42 will be in circuit in series through the lamp 38.

Figure 7:
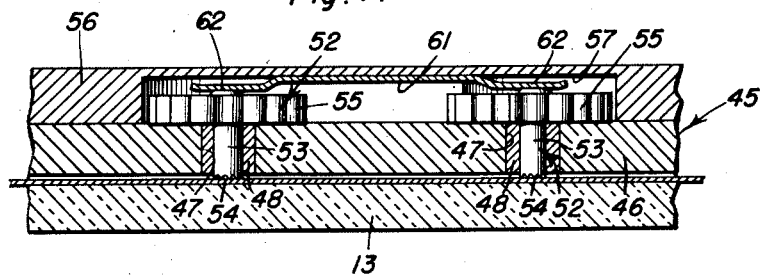
Figure 7 is a fragmentary enlarged sectional view through the base and cover.
Figure 8:
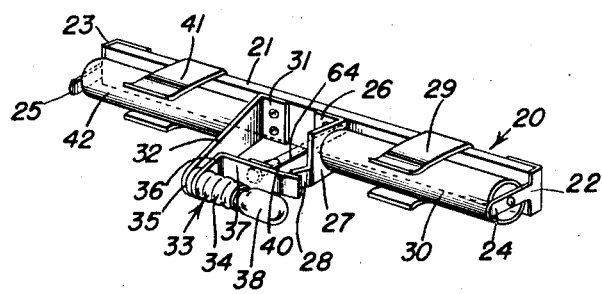
Figure 8 is an inverted perspective view of the base illuminating unit.

Extending rearwardly from the frame 12 intermediate its ends is a pair of spaced ears 43 which are pierced to receive a hinge pin 44 by means of which the cover for the device designated generally 45 is hingedly supported with relation to the base 10. This cover comprises a bottom plate 46 which is provided at spaced intervals with openings 47 in which bearing bushings 48 are fitted. This plate is also provided with a depending hinge barrel 50 which is pierced to receive the hinge pin 44 in order pivotally to couple the cover with the base. The openings 47 are preferably arranged in a longitudinally extending row adjacent the marginal edge of the plate 46 carrying the barrel 50 and formed at the underside of the plate at spaced intervals are recesses 51 which when the cover is in closed position align with the pins 17, to accommodate the upper ends thereof. Mounted for rotation in the bushings 48 are the emulsion scrapers designated generally 52, each of which comprises a tubular shank 53 (Fig. 7) provided at one end with an annular row of longitudinally extending scraper teeth 54 and carrying at its opposite end a spur toothed pinion 55. As illustrated in Figure 7 the pinions serve as stops to limit the distance that the tubular members 53 may extend through the bushings 48 in order to bring the scraper teeth 54 into proper relation to a film placed on the base of the device. Detachably secured to the plate 46 is a cap plate 56 provided in its underside with an elongated longitudinal groove 57 and an elongated slot 58 which opens through the upper side of the cap plate 56 and communicates with the groove 57. Mounted for longitudinal sliding movement in the groove 57 is a toothed rack bar 59, the teeth of which mesh with the pinions 55 so that as the rack bar is moved longitudinally the pinions and their respective scraper teeth 54 will be rotated about their respective axes. A suitable actuating knob 60 extends through the slot 58 and into the rack bar 59 so that the rack bar may be manually moved to cause the rotation and oscillation of the scrapers 52. In order that the scrapers 52 may yieldingly be held in the bushings 48 and the cutter teeth 54 yieldingly projected therethrough I provide for each pair of scrapers a spring 61 opposite ends of which are bowed as at 62 yieldingly to bear on the ends of the tubular shanks 53 remote from the annular row of teeth 54.

Extending through the back wall of the frame 12 midway between the ears 43 is an elongated tubular bushing 63 in which a push pin 64 is mounted to slide. This pin is of a length slightly greater than the length of the bushing 63 and one end of the pin bears on the non-conducting cushion member 40 carried by the spring finger 37, so that as the spring finger moves toward the contact finger 28, the pin will be advanced longitudinally through the tubular bushing 63 to project beyond the rear face of the rear wall of the frame 12, and in the path of movement of the barrel 50 as the latter swings about the axis of the pin 44. It will thus be seen that when the cover 45 is moved to closed position over the upper surface of the plate 13 pressure will be exerted on the push rod 64 to cause the same to bear against the cushion 40 of the spring finger 37 and move the finger out of contact with the contact finger 28, thus breaking the circuit through the lamp 38. Conversely when the cover is raised, the barrel 50 will move away from the pin 64 to permit the latter to move under the influence of the spring finger 37 until contact is made through the lamp 38, thus to illuminate a film in place on the light transmitting plate 13.

In use it will be understood that the cover 45 is moved to open position about the axis of the pivot pin 44, thus permitting the pin 64 to move under the influence of the spring finger 37 to close the electrical circuit through the lamp 38. The film to be marked is then placed on the plate 13 with the pictures properly aligned with the indices thereon and the adjacent edges of the pictures aligning with the guide lines 15, and the pictures aligning with the panels 16 defined by the guide lines. With the film properly positioned on the plate 13, the pins 17 will project through the sprocket holes adjacent opposite side edges of the film whereupon the cover 45 is lowered or closed over the film. It will be understood of course that the emulsion bearing face of the film is turned upwardly so as to face the cover when the latter is in closed position. Simultaneously with the movement of the cover into closed position, pressure will be exerted by the barrel 50 on the projecting end of the pin 64, thus to move it against the effort of the spring finger 37 and cause the latter to move away from the contact 28, thus breaking the circuit through the lamp 38. With the cover in completely closed position, the toothed ends of the scrapers 52 will bear on the emulsion bearing face of the film so that when the scrapers are rotated or oscillated the emulsion will be removed from a limited area of the film. Rotation and oscillation of the scrapers about their respective axes is achieved by reciprocation of the knob 60 so that all of the scrapers will be moved in unison by reason of the movement of the rack bar 59 and its meshing engagement with the teeth of the pinions 55. The proper pressure of the teeth 54 against the emulsion bearing surface of the film is achieved by means of the bowed ends 62 of the springs 61 so that compensation for slightly different film thicknesses may be provided. When the film has been properly marked it may easily and quickly be removed by simply lifting the cover and disengaging the film from the pins 17.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

1. A film marker comprising a base, guide pins projecting upwardly from the base and adapted to cooperate with the perforations along the marginal edges of a strip of motion picture film in locating the film on the base, a cover carried by the base and cooperating therewith in clamping the strip of film against movement relative to the base, a rotary scraper carried by the cover, means carried by the cover for urging the scraper into yielding contact with the film, and means carried by the cover and connected to the scraper for rotating it.

2. A film marker comprising a base, guide pins projecting upwardly from the base and adapted to cooperate with the perforations along the marginal edges of a strip of motion picture film in locating the film on the base, a cover hinged to the base and adapted to cooperate therewith in holding the strip of film against movement relative to the base, a group of rotary scrapers carried by the cover for engagement with the emulsion coated side of the film to remove the emulsion from a limited area thereof and means carried by the cover to drive the scrapers in unison.

3. A film marker comprising a base, guide pins projecting upwardly from the base and adapted to cooperate with the perforations along the marginal edges of a strip of motion picture film in locating the film on the base, a cover hinged to the base and adapted to cooperate therewith in holding the strip of film against movement relative to the base, a scraper mounted in the cover to rotate about an axis which lies perpendicular to the base when the cover is in film clamping position to engage the emulsion bearing side of the film and scrape the emulsion from a limited area thereof, and reciprocal means carried by the cover and connected to the scraper to rotate said scraper.

4. A film marker comprising a base, guide pins projecting upwardly from the base and adapted to cooperate with the perforations along the marginal edges of a strip of motion picture film in locating the film on the base, a cover hinged to the base and adapted to cooperate therewith in holding the strip of film against movement relative to the base, a group of scrapers mounted in the cover to rotate about axes which lie perpendicular to the base when the cover is in film clamping position to engage the emulsion bearing side of the film and means to move said scrapers about their axes in unison simultaneously to scrape the emulsion from limited areas of the film.

5. A film marker comprising a base, guide pins projecting upwardly from the base and adapted to cooperate with the perforations along the marginal edges of a strip of motion picture film in locating the film on the base, a cover hinged to the base and adapted to cooperate therewith in holding the strip of film against movement relative to the base, a group of scrapers mounted in the cover to rotate about axes which lie perpendicular to the base when the cover is in film clamping position to engage the emulsion bearing side of the film, a bar slidably mounted in the cover to engage the scrapers and move them in unison and cause them to scrape the emulsion from limited areas of the film and means coupled to the bar for the manual actuation thereof.

6. A film marker comprising a base, guide pins projecting upwardly from the base and adapted to cooperate with the perforations along the marginal edges of a strip of motion picture film in locating the film on the base, a cover hinged to the base and adapted to cooperate therewith in holding the strip of film against movement relative to the base, a rotary scraper carried by the cover for engagement with the emulsion coated side of the film to remove the emulsion from a limited area thereof, means carried by the cover yieldingly to urge the scraper into contact with the film, and reciprocal means carried by the cover and connected to the scraper for rotating the said scraper.

7. A film marker comprising a base, guide pins projecting upwardly from the base and adapted to cooperate with the perforations along the marginal edges of a strip of motion picture film in locating the film on the base, a cover hinged to the base and cooperating therewith in clamping the strip of film against movement relative to the base, a group of rotary scrapers carried by the cover for engagement with the emulsion coated side of the film to remove the emulsion from a limited area thereof and means carried by the cover to drive the scrapers in unison and means carried by the cover yieldingly to urge the scrapers into contact with the film.

8. A film marker comprising a base, guide pins projecting upwardly from the base and adapted to cooperate with the perforations along the marginal edges of a strip of motion picture film in locating the film on the base, a cover hinged to the base and adapted to cooperate therewith in holding the strip of film against movement relative to the base, a scraper mounted in the cover to rotate about an axis which lies perpendicular to the base when the cover is in film clamping position to engage the emulsion bearing side of the film and scrape the emulsion from a limited area thereof, means carried by the cover yieldingly to urge the scraper into contact with the film, and reciprocal means carried by the cover and connected to the scraper to rotate said scraper.

9. A film marker comprising a base, guide pins projecting upwardly from the base and adapted to cooperate with the perforations along the marginal edges of a strip of motion picture film in locating the film on the base, a cover hinged to the base and adapted to cooperate therewith in holding the strip of film against movement relative to the base, a group of scrapers mounted in the cover to rotate about axes which lie perpendicular to the base when the cover is in film clamping position to engage the emulsion bearing side of the film and means to move said scrapers about their axes in unison simultaneously to scrape the emulsion from limited areas of the film, and means carried by the cover yieldingly to urge the scrapers into contact with the film.

10. A film marker comprising a base, guide pins projecting upwardly from the base and adapted to cooperate with the perforations along the marginal edges of a strip of motion picture film in locating the film on the base, a cover hinged to the base and adapted to cooperate therewith in holding the strip of film against movement relative to the base, a group of scrapers mounted in the cover to rotate about axes which lie perpendicular to the base when the cover is in film clamping position to engage the emulsion bearing side of the film, a bar slidably mounted in the cover to engage the scrapers and move them in unison and cause them to scrape the emulsion from limited areas of the film, means coupled to the bar for the manual actuation thereof, and means carried by the cover yieldingly to urge the scrapers into contact with the film.

IRVING I. MERKUR.

REFERENCES CITED

The following references are of record in the file of this patent:

UNITED STATES PATENTS

| Number | Name | Date |
|---|---|---|
| 807,776 | Reisler | Dec. 19, 1905 |
| 1,191,321 | Kunert | July 18, 1916 |
| 1,471,864 | Sentou et al. | Oct. 23, 1923 |
| 1,623,816 | Spencer | Apr. 5, 1927 |
| 1,866,587 | Warren | July 12, 1932 |
| 2,184,546 | Collins | Dec. 26, 1936 |
| 2,304,234 | Bliss | Dec. 8, 1942 |